(12) United States Patent
Kitamura

(10) Patent No.: US 8,004,616 B2
(45) Date of Patent: Aug. 23, 2011

(54) TELEVISION RECEIVER HAVING A PLURALITY OF STANDBY POWER MODES

(75) Inventor: Hideo Kitamura, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1424 days.

(21) Appl. No.: 11/482,169

(22) Filed: Jul. 7, 2006

(65) Prior Publication Data

US 2007/0046833 A1    Mar. 1, 2007

(30) Foreign Application Priority Data

Aug. 24, 2005  (JP) .................. 2005-242349

(51) Int. Cl.
H04N 5/63    (2006.01)
H04N 5/44    (2006.01)

(52) U.S. Cl. ....................... 348/730; 348/725

(58) Field of Classification Search .............. 348/725, 348/734, 730, 552, 460, 473; 345/214, 211, 345/212, 158, 169; 455/3.03, 3.06; 713/320, 713/323, 324, 340; 725/80, 153, 10, 12, 725/58, 141, 133; H04N 5/63, 5/44

See application file for complete search history.

(56) References Cited

U.S. PATENT DOCUMENTS

| | | | |
|---|---|---|---|
| 6,285,406 B1 * | 9/2001 | Brusky | 348/730 |
| 6,393,573 B1 * | 5/2002 | Gillespie et al. | 713/324 |
| 7,411,631 B1 * | 8/2008 | Joshi et al. | 348/730 |

FOREIGN PATENT DOCUMENTS

JP    2003-150282 A    5/2003

* cited by examiner

Primary Examiner — Sherrie Hsia

(74) Attorney, Agent, or Firm — Birch, Stewart, Kolasch & Birch, LLP

(57) ABSTRACT

A television receiver having a security module fixing part for descrambling digital broadcast comprises at least a standby power mode for supplying power only to hardware, such as a remote control receiver (full standby), a standby power mode for supplying power also to a security module other than the hardware supplied with power in the full standby (partial standby), and a standby power mode for stopping supply of power only to a monitor at minimum (false standby) and has a standby power mode determination part for controlling presentation of images and electronic program guides to a user at startup.

5 Claims, 3 Drawing Sheets

TELEVISION RECEIVER HAVING A PLURALITY OF STANDBY POWER MODES

The present application is based on and claims priority of Japanese patent application No. 2005-242349 filed on Aug. 24, 2005, the entire contents of which are hereby incorporated by reference.

BACKGROUND OF THE INVENTION

1. Field of the Invention

The present invention relates to a television receiver having a plurality of standby power modes.

2. Description of the Related Art

In the past, in order to reduce standby power, a television receiver has selected, according to the situation during a power supply off period, a standby power mode for supplying power only to minimum required hardware being required for receiving only remote control operations and the like from a user (hereinafter, 'full standby mode') and a standby power mode for stopping supply of power only to a monitor (hereinafter, 'false standby mode').

Moreover, an I/F (interface) with a security card called a CableCARD module is required for a television receiver with a digital cable receiving function in North America in order to descramble cable TV programs. The receiver is required in the standards that it should maintain the communication with the CableCARD module so as to normally supply power to the CableCARD module even in the power supply off period and to acquire EMM (Entitlement Management Message) and the like even when the power supply of the CableCARD module is turned off. Accordingly, in North America, there are also ones comprising a standby power mode for supplying power also to hardware required for the communication with the CableCARD module (hereinafter, 'partial standby mode') together with minimum required hardware for receiving only remote control operations and the like from the above-mentioned user.

As for conventional techniques of a power supply controller and a power supply control method of a video recording/reproducing device for receiving and recording/reproducing television broadcast, for example a power supply control method, as described in Japanese Unexamined Patent Application Publication No. 2003-150282 for acquiring present time when input by a user, for calculating the reservation time for power being turned on and the standby end time and storing them in a memory and for supplying power only to a predetermined portion of the device till the reservation time for standby is known.

However, for example, when a television receiver is provided with an electronic program guide and a user sets to automatically display the electronic program guide at turning on of the power supply, and when a channel to be displayed first at turning on of the power supply requires a descrambling process by a CableCARD module, a startup from the above-mentioned full standby or the partial standby requires restarting in view of software. Accordingly, it takes time till displaying a program guide and programs after startup for both the full standby and the partial standby, thus making the user to feel inconvenient even though standby power can be reduced.

SUMMARY OF THE INVENTION

A television receiving set having a security module fixing part for descrambling digital broadcast comprises at least a standby power mode for supplying power only to hardware, such as a remote control receiving part (full standby), a standby power mode for supplying power also to a security module other than the hardware to which power is supplied in the full standby (partial standby), and has a standby power mode determination part for preventing the presentation of images and electronic program guides to a user at startup from being too late.

The set also selects the false standby power mode when it is required to automatically display the above-mentioned electronic program guide at the next startup in the standby power mode determination part.

The set does not automatically display the above-mentioned electronic program guide at the next startup and it has the above-mentioned security module fixed thereon, and it selects the false electric power standby mode when the descrambling process is required for watching and listening to a channel to be presented to a user at the next startup in the above-mentioned security module while it selects the partial electric power standby mode when not required in the standby power mode determination part.

Since the standby power mode is determined so as to prevent the presentation of images and electronic program guides to a user at startup from being too late, a weak point of ease of use by the user being impaired for restraining standby power is eliminated, thus making the standby power and the ease of use by the user to be in a good balance.

When the automatic display of the electronic program guide is enabled, to turn down to the false standby for permitting the electronic program guide to be immediately displayed as the power supply being turned on means to pay attention to a will of the user desiring to quickly confirm the electronic program guide and the increase of ease of use surpasses shortcomings of the standby power being too large.

When the automatic display of the electronic program guide is disabled, since the false standby or the partial standby is adaptably selected based on whether or not the descrambling process is required for watching and listening to the channel to be presented to the user at the next startup in the security module, the standby power can be reduced to the minimum with prioritizing the ease of use so as to immediately present desired images to the user.

DESCRIPTION OF THE PREFERRED EMBODIMENTS

Figure 1:
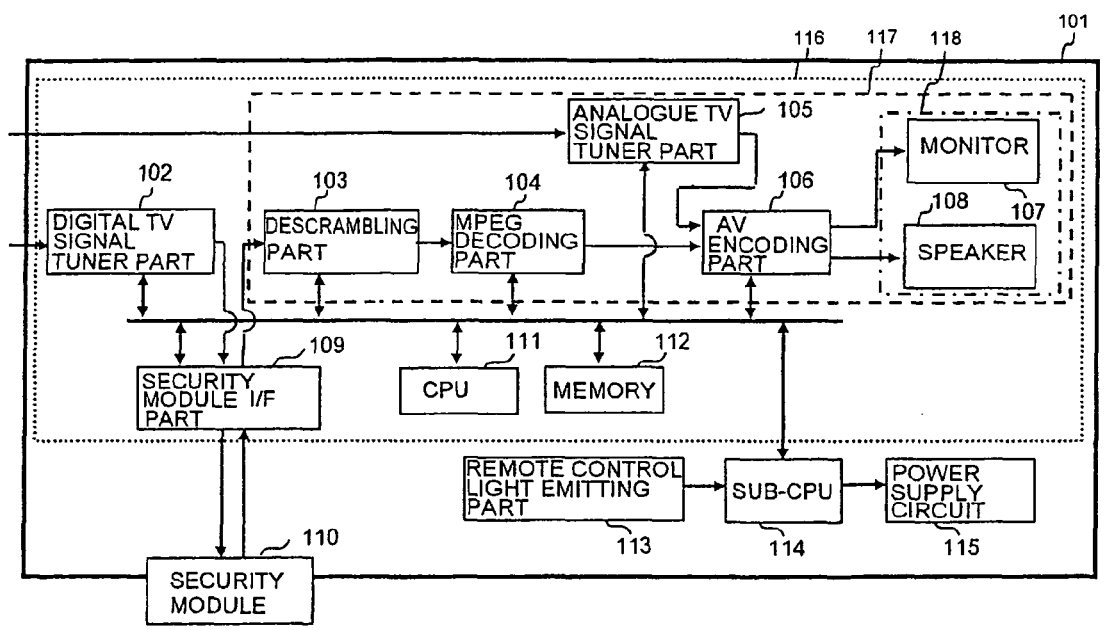
FIG. 1 is a block diagram of a television receiver having a plurality of standby power modes according to the present invention.

In the following, embodiments according to the present invention are described referring to the drawings.

FIG. 1 shows a block diagram of a television receiver according to the present invention.

A digital TV signal tuner part 102 has a VSB (Vestigital Side Band) demodulation part and a QAM (Quadrature Amplitude Modulation) demodulation part, receives a signal of either of ground wave digital broadcast or cable TV broadcast according to user's tuning directions, and takes out a desired MPEG (Moving Picture Experts Group) transport stream.

A security module I/F part 109 controls input/output and the like of the MPEG transport stream into a security module 110. The security module 110 is a PC card used for a conditional access processing of the cable TV broadcast called a CableCARD module in North America.

When a digital program of the cable TV broadcast is selected and if the security module 110 is fixed, the MPEG transport stream is sent out to the security module 110 via the security module I/F part 109. When the security module 110 is not inserted or ground wave digital broadcast is tuned in, the stream is sent out to a descrambling part 103 directly.

The security module 110 determines the watching and listening propriety of the tuned-in cable TV program according to the user's contract information in the EMM transmitted from a cable station, and if it can be descrambled, scrambling to the corresponding program is canceled for the input MPEG transport stream.

When a program needs a copy control, the security module 110 newly gives scrambling to the MPEG transport stream so that a raw MPEG transport stream should not be illegally robbed from the security module 110 to the descrambling part 103. After processing in such a way, the MPEG transport stream is sent out to the descrambling part 103 via the security module I/F 109.

The descrambling part 103 cancels scrambling for the copy controls of the MPEG transport stream by the above-mentioned security module 110, and an MPEG decoding part 104 performs demultiplexing processes and AV decoding processes of MPEG.

An analog TV signal tuner part 105 demodulates ground wave analog broadcast programs or analogue broadcast programs of cable TV broadcast according to user's tuning directions.

An AV encoding part 106 performs AV encoding processes for outputting images and sounds in response to AV demodulation signals from the MPEG decoding part 104 and the analog TV signal tuner part 105 and sends out the signals to a monitor 107 and a speaker 108, and the images and sounds come out with the monitor 107 and the speaker 108.

A CPU 111 controls entirely using the programs and data stored in a memory 112.

A remote control light receiving part 113 receives remote control signals, and a sub-CPU 114 analyzes the remote control signals for controlling a power supply circuit 115 and for communication with a CPU 111.

A power supply circuit 115 supplies power/stops supply of power so that it may have the following three standby power modes at the time of power supply off.

(a) Full standby: to supply power only to the minimum required hardware, such as a remote control reception part and the like (to stop power supply to hardware enclosed with dotted lines 116).

(b) Partial standby: to supply power also to hardware required for the communication with the security module 111 in addition to the minimum required hardware, such as a remote control receiving part and the like (to stop power supply to hardware enclosed with dashed lines 117).

(c) False standby: to stop power supply only to a monitor and a speaker (to stop power supply to hardware enclosed with chain lines 118).

An electronic program guide is provided to a receiver 101, and it has a function for automatically displaying the electronic program guide at the time of power supply on (hereinafter, automatic guide display function) and can set up whether or not the function is enabled with a menu.

Figure 2:
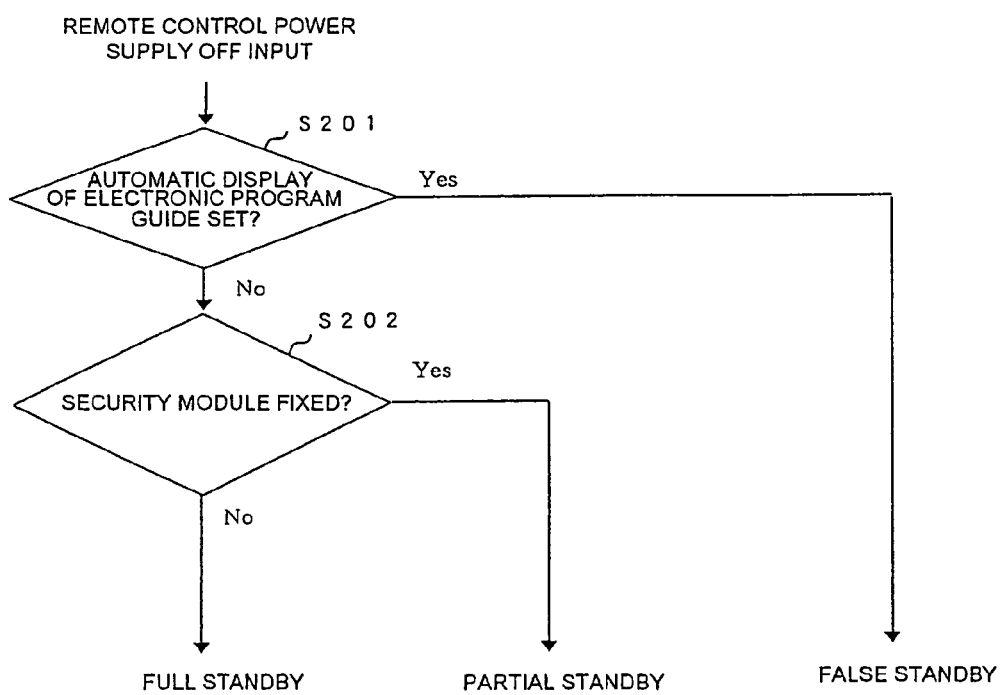
FIG. 2 is a flowchart illustrating standby power mode selection according to the present invention.

Selection of the standby power mode at the time of remote control power supply off follows the flowchart of FIG. 2. The false standby will be selected if the automatic guide display function is set to be effective at S201. It is because it can be said that inconvenient for the user would be enormous due to requiring considerable time till displaying the guide after starting up in the full standby or partial standby, and the false standby, which permits immediate displaying of the guide, would be more preferable even though the false standby requires largest standby power.

If the automatic guide display function is set to be disabled at S201, it will be determined whether or not a security card is equipped at S202. The full standby is chosen if the security card is not equipped. Since standby power would be smallest accordingly and a guide display and descrambling processes are not required, the images and sounds can be immediately presented to the user, thus avoiding making the user to feel inconvenient.

The partial standby is selected if the security card is equipped at S202. Since it conforms to the constraint in the standards that power should be normally supplied to a security card even at the time of power supply off and serves to reduce power consumption and it is prevented that the CPU power is taken to the automatic guide display function at the time of startup, scrambling can be cancelled in little time even when a channel after startup is of a scrambled program of cable TV and the program can be presented to the user.

Figure 3:
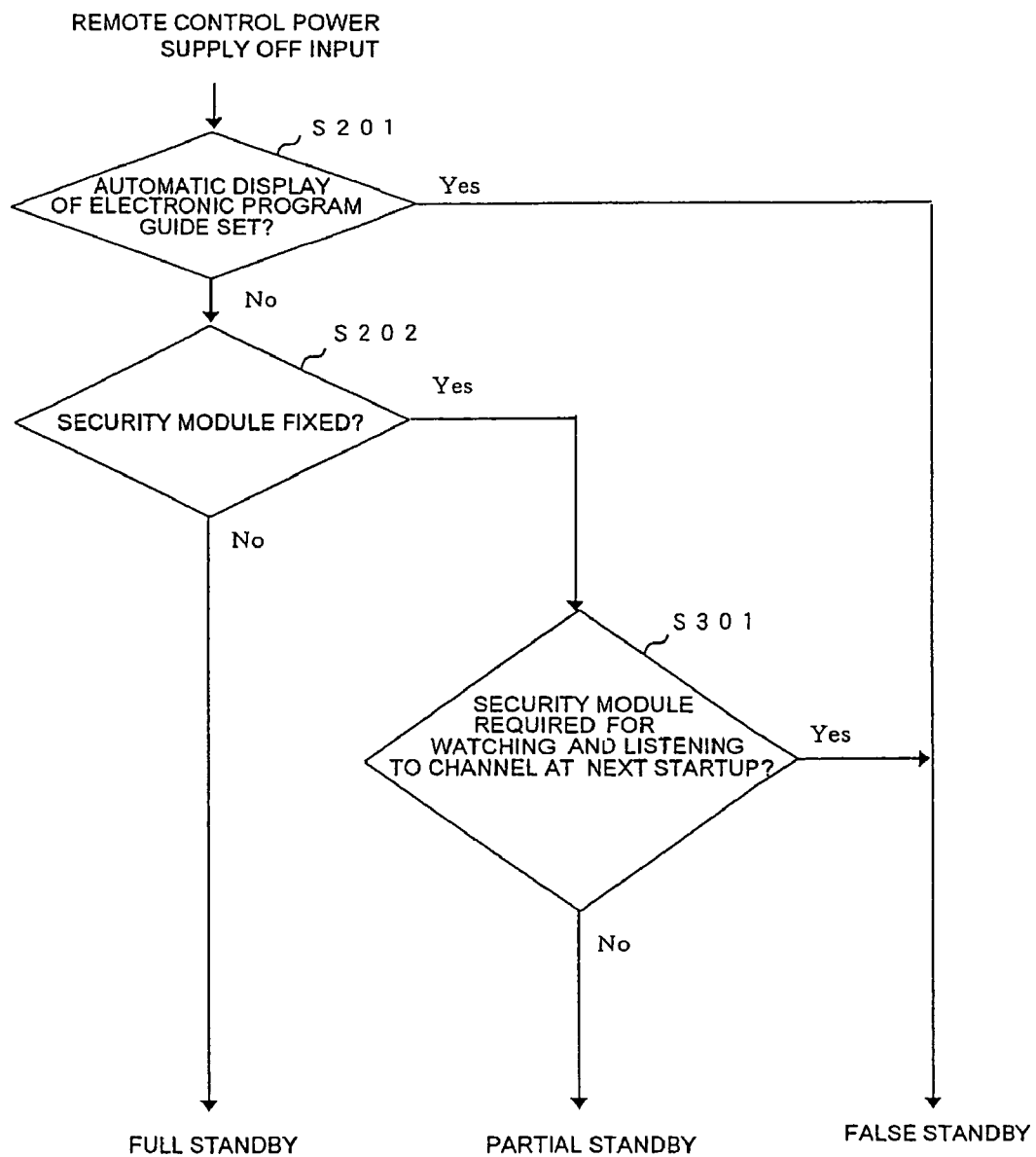
FIG. 3 is a flowchart illustrating standby power mode selection according to the present invention.

Selection of the standby power mode at the time of remote control power supply off may follow the flowchart of FIG. 3. The same numerals are given to the same steps as in FIG. 2.

When the security card is equipped at S202, it is determined whether or not a security module is required for watching and listening to the channel at the next startup at S301. Since ground wave digital broadcast and analogue broadcast of ground waves or cable TV can be watched and listened to without a security module, the partial standby is selected, while the false standby is selected since a security module is required for digital broadcast of cable TV.

Although standby power would be larger accordingly, after startup, all the programs including scrambled digital broadcast of cable TV can be immediately displayed, thus eliminating inconvenient to the user.

Since programs without scrambling can be watched and listened to without a security module even though it is of digital broadcast of cable TV, it is also possible to lead to the partial standby by adding this condition to S301.

Moreover, since as for hardware enclosed by 116 shown in FIG. 1, for example a CPU 112, a descrambler part 103, and an MPEG decoding part 104 may be assembled into one chip, it may vary with actual hardware configurations.

What is claimed is:

1. A television receiving set having a security module part for descrambling a received digital broadcast, comprising:
a full standby power mode for supplying power only to minimum necessary hardware including at least a remote control receiving part, a partial standby power mode for supplying power also to hardware required for the communication with a security module fixed on the security module fixing part in addition to the minimum necessary hardware including at least the remote control receiving part, and a false standby power mode for suspending only the power supply to a monitor and speaker, wherein a standby power mode determination part determines the setting of an automatic display function of an electronic program guide at startup and the necessity of using a settable descrambling process at startup and selects a specific standby power mode, and supplies power based on each different standby power mode for standby selected.

2. A television receiving set according to claim 1, wherein the standby power mode determination part determines that the false standby power mode is selected a least when the function for automatically displaying the above-mentioned electronic program guide at the next startup has been selected.

3. A television receiving set according to claim 1, wherein the standby power mode determination part determines that automatic display of the electronic program guide at the next startup has not been selected and watching and listening to a selected channel at the next startup requires using a settable descrambling process relative to the security module fixed thereon, the standby power mode determination part selects the false electric power standby mode while the standby power mode determination part selects the partial electric power standby mode when watching and listening to a selected channel at the next startup does not require using a settable descrambling process relative to the security fixed thereon.

4. A television receiving set according to claim 1, wherein the standby power mode determination part selects the above-mentioned false electronic standby power mode when the function for automatically displaying the above-mentioned electronic program guide at the next startup has not been selected so that the electronic program guide is not displayed at the next startup and the standby power mode determination part selects the false electric power standby mode when the descrambling process is required for watching and listening to a channel to be presented to a user at the next startup while the standby power mode determination part selects the partial electric power standby mode when the descrambling process for watching and listening to a channel to be presented to a user at the next startup is not required.

5. A television receiver for receiving a digital broadcast, comprising:
   a full standby power mode, a partial standby power mode, and a false standby power mode, wherein
   a standby power mode determination part determines that the false standby power mode is selected at least when an automatic display function of an electronic program guide at a next startup has been selected,
   wherein the standby power mode determination part determines that automatic display of the electronic program guide at the next startup has not been selected and watching and listening to a selected channel at the next startup requires using a settable descrambling process relative to a security module fixed thereon, the standby power mode determination part selects the false electric power standby mode while the standby power mode determination part selects the partial electric power standby mode when watching and listening to a selected channel at the next startup does not require using a settable descrambling process relative to the security module fixed thereon.

* * * * *